United States Patent [19]
Tanaka

[11] Patent Number: 6,089,359
[45] Date of Patent: Jul. 18, 2000

[54] HYDRAULIC CONTROL DEVICE AND BRAKE DEVICE USING SAME

[75] Inventor: Masaaki Tanaka, Saitama, Japan

[73] Assignee: Akebono Brake Industry Co., Ltd., Tokyo, Japan

[21] Appl. No.: 09/190,270

[22] Filed: Nov. 13, 1998

[30] Foreign Application Priority Data

Nov. 17, 1997 [JP] Japan .................................. 9-315397

[51] Int. Cl.[7] .............................. B60T 13/00; P03C 1/00
[52] U.S. Cl. .......................................... 188/162; 188/156
[58] Field of Search .................................. 188/72.6, 162, 188/156, 158, 106 F; 303/3, 15, 20, 115.2

[56] References Cited

U.S. PATENT DOCUMENTS

| | | | |
|---|---|---|---|
| 3,790,225 | 2/1974 | Wehde | 188/162 |
| 4,850,459 | 7/1989 | Johannesen et al. | 188/162 |
| 4,860,859 | 8/1989 | Yamatoh et al. | 188/162 |
| 5,667,284 | 9/1997 | Drennen et al. | 188/156 |

*Primary Examiner*—Matthew C. Graham
*Attorney, Agent, or Firm*—Morgan, Lewis & Bockius LLP

[57] ABSTRACT

A brake device includes a main piston slidably mounted within a caliper body of the brake device, a cylinder body provided inside an inner periphery of the piston, a sealed fluid chamber which is formed by the cylinder body and an inner peripheral surface of the main piston, and is filled with a fluid, a shaft rotatably mounted on the cylinder body, pressure control pistons which are driven by the shaft to move into and out of the fluid chamber, a linear movement conversion mechanism provided between the shaft and each of the pressure control pistons so as to convert a rotation of the shaft into a linear movement of the pressure control piston, a motor for rotating the shaft, a speed changer provided between the shaft and the motor so as to transmit the number of revolutions of the motor to the shaft in a manner to reduce the number of revolutions, and an electronic control unit (ECU) for controlling the motor.

3 Claims, 5 Drawing Sheets

HYDRAULIC CONTROL DEVICE AND BRAKE DEVICE USING SAME

BACKGROUND OF THE INVENTION

1. Field of the Invention

The present invention relates to an electrically-operated (so-called by-wire-type) hydraulic control device which can smoothly increase and decrease a fluid pressure in a hydraulic control circuit. The invention also relates to a brake device of a compact, lightweight design which has the above hydraulic control device incorporated in a caliper of a disc brake of a vehicle, an can achieve a smooth hydraulic control such as an anti-lock control and a traction control.

2. Related Art

Recently, in order to provide a vehicle brake device capable of dealing with various brake control modes, there has been developed an electrically-operated (by-wire-type) brake device as disclosed in Post-examined Japanese Patent Publication No. Hei. 4-28931. The vehicle brake device of this type comprises a motor, a speed changer having a planetary gear mechanism, a ball thread and soon. On the other hand, there has also been developed an anti-lock control device of the circulating type as disclosed in Unexamined Japanese Patent Publication No. Hei. 9-164934 in which a motor is operated quite effectively, and the operating sounds or noises of the motor and a pump are made quiet, thereby providing a good operating feeling of a brake pedal.

However, in the construction of the former electrically-operated brake device, a rotational force from the motor is reduced by the speed changer, and then a brake piston is operated through the ball thread. Therefore the response is poor and, in addition to that, the weight and volume of the device are increased, which is disadvantageous in the achievement of a lightweight, compact design. Particularly in case of a disc brake of the type in which a rotary-type motor, an encoder, a speed changer and a hydraulic pressure-generating portion are combined together into a generally unitary construction, the device becomes more bulky than a hydraulic brake, used in current passenger cars, if these component parts are merely connected together. Therefore there suffers from a problem that the application of this device is limited because of a currently-available device-mounting space.

In the latter anti-lock control device, the motor can be operated quite effectively, and the sounds or noises of the motor and pump can be made quiet. However, in this device, a relief valve and so on are required and a path of piping is accordingly complicated. Further, there would raise a problem of the occurrence of the pulsations which are undesirable from the performance point of view.

SUMMARY OF THE INVENTION

It is therefore an object of the present invention to provide an electrically-operated, i.e., by-wire-type, fluid pressure-generating device, which is provided with a rotary-type motor, a speed changer and a fluid pressure-generating portion which are combined together into a generally unitary construction, and also to provide a brake device using this fluid pressure-generating device, thereby solving the problems of the above conventional brake device.

As technical solving means adopted in the present invention, there is provided a hydraulic control device which includes: a sealed fluid chamber which is formed in a body, and is filled with a fluid; a cylinder body provided in the fluid chamber; a shaft rotatably mounted on the cylinder body; pressure control pistons which are driven by the shaft to move into and out of the fluid chamber; a linear movement conversion mechanism provided between the shaft and each of the pressure control pistons so as to convert a rotation of the shaft into a linear movement of the pressure control piston; a motor for rotating the shaft; a speed changer provided between the shaft and the motor so as to transmit the number of revolutions of the motor to the shaft in a manner to reduce the number of revolutions; and an electronic control unit (ECU) for controlling the motor.

According to another aspect of the invention, there is also provided a brake device which includes: a main piston slidably mounted within a caliper body of the brake device; a cylinder body provided inside an inner periphery of the piston; a sealed fluid chamber which is formed by the cylinder body and an inner peripheral surface of the main piston, and is filled with a fluid; a shaft rotatably mounted on the cylinder body; pressure control pistons which are driven by the shaft to move into and out of the fluid chamber; a linear movement conversion mechanism provided between the shaft and each of the pressure control pistons so as to convert a rotation of the shaft into a linear movement of the pressure control piston; a motor for rotating the shaft; a speed changer provided between the shaft and the motor so as to transmit the number of revolutions of the motor to the shaft in a manner to reduce the number of revolutions; and an electronic control unit (ECU) for controlling the motor.

DESCRIPTION OF THE PREFERRED EMBODIMENTS

A preferred embodiment of the present invention will now be described with reference to accompanying drawings.

Figure 1:
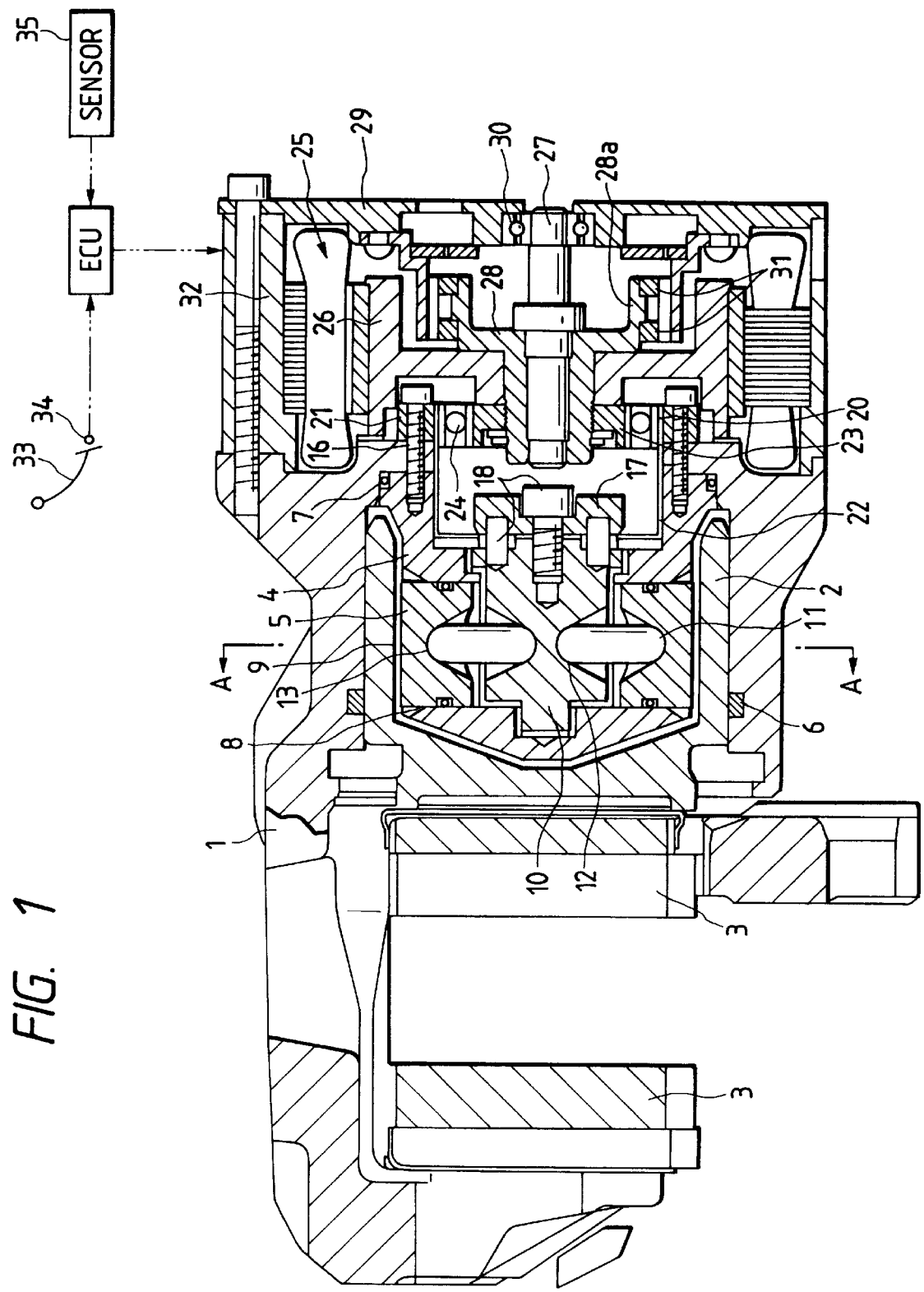
FIG. 1 is a cross-sectional view of a first embodiment of the present invention directed to a brake device having a hydraulic control device incorporated in a brake caliper.
Figure 2:
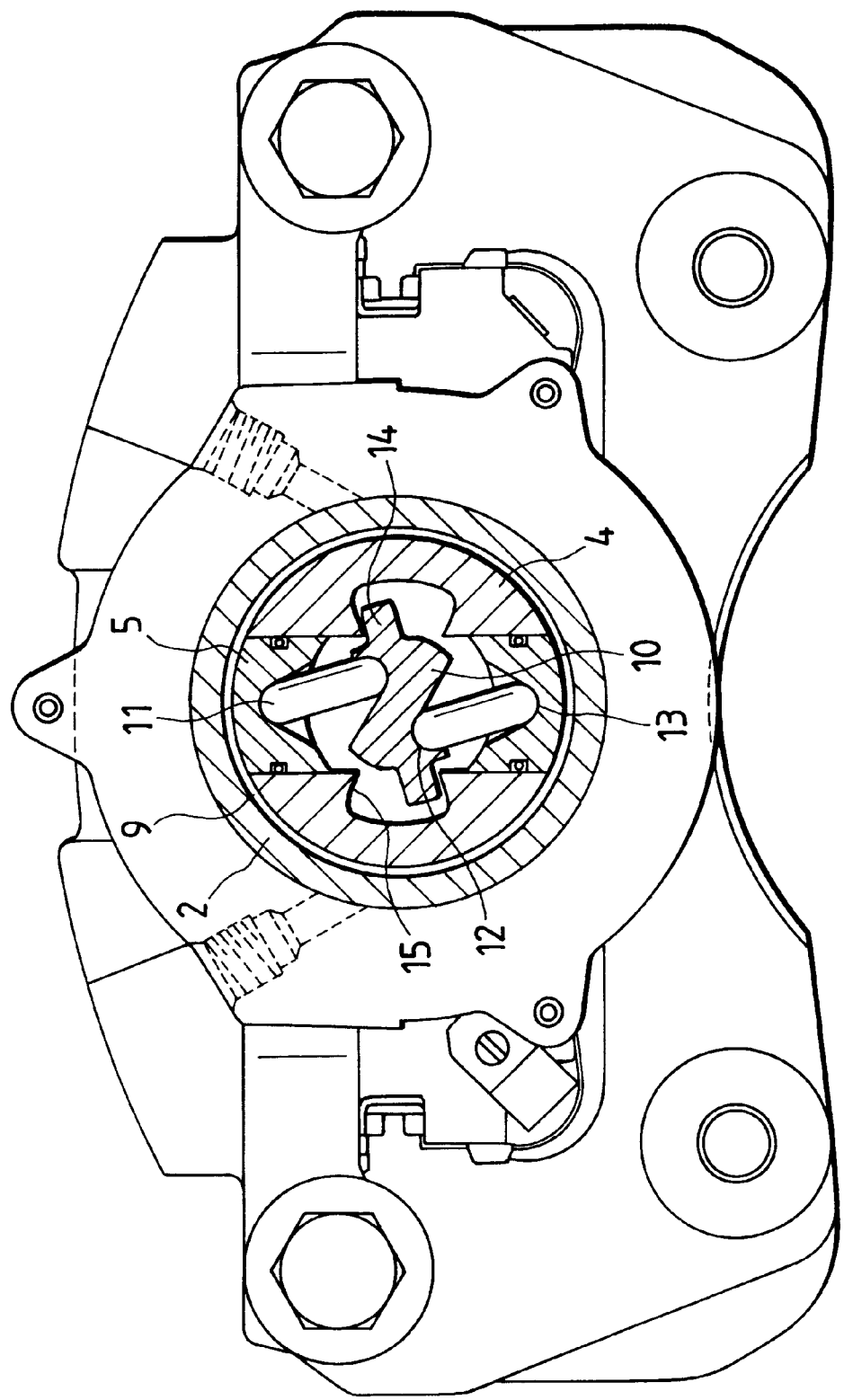
FIG. 2 is a cross-sectional view taken along the line A—A of FIG. 1, showing a condition in which the pressure within a fluid chamber is increased.
Figure 3:
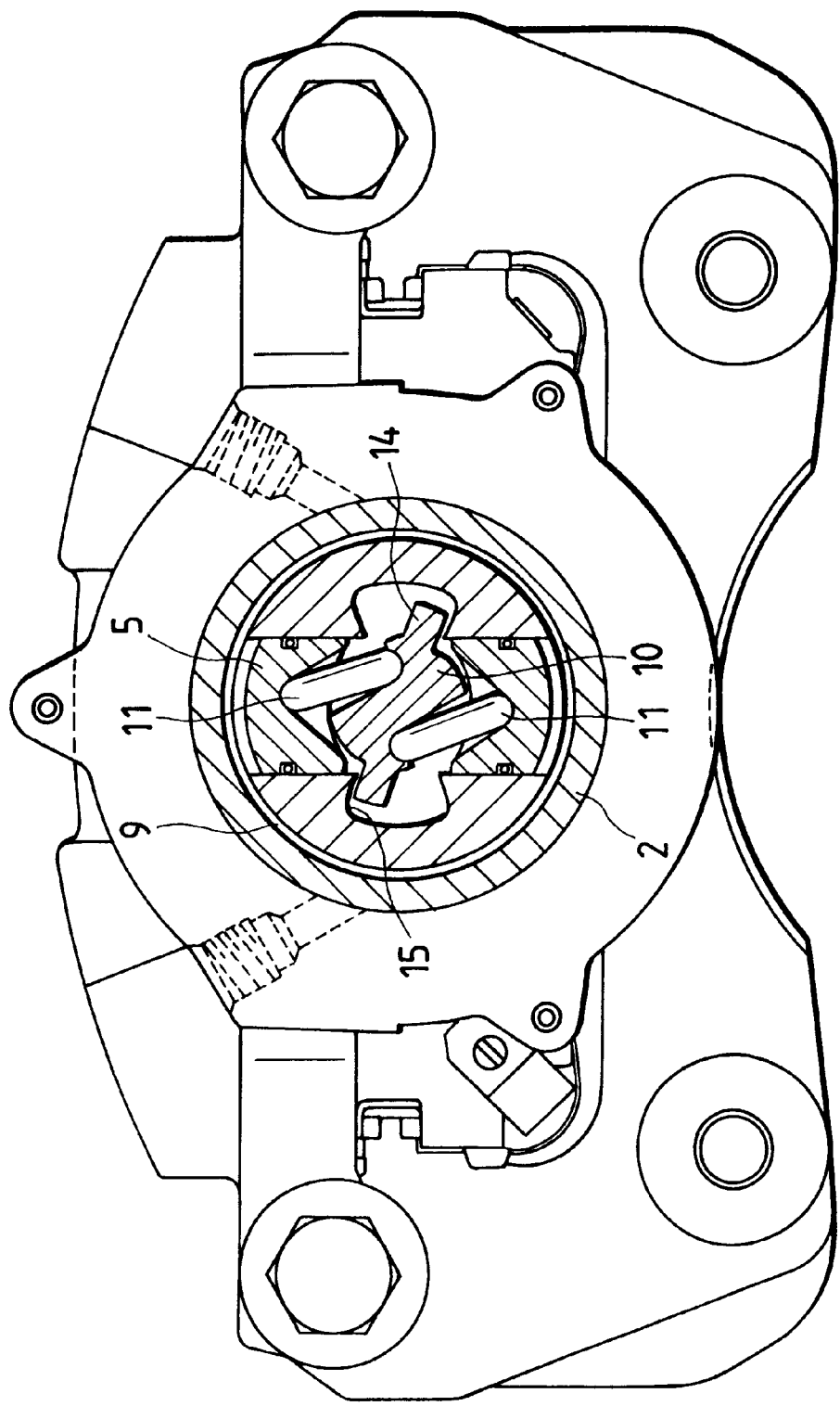
FIG. 3 is a cross-sectional view taken along the line A—A of FIG. 1, showing a condition in which the pressure within the fluid chamber is decreased.

FIG. 1 is a cross-sectional view of a first embodiment of the present invention directed to a brake device having a hydraulic control device incorporated in a brake caliper, FIG. 2 is a cross-sectional view taken along a line A—A of FIG. 1, showing a condition in which the pressure within a fluid chamber is increased, and FIG. 3 is a cross-sectional view taken along the line A—A of FIG. 1, showing a condition in which the pressure within the fluid chamber is decreased.

As shown in FIG. 1, the brake device is provided with a caliper body 1, a main piston 2, a brake pad 3, a cylinder body 4 fixedly mounted on the caliper body, a pressure control piston 5 slidably mounted within the cylinder body 4, a seal piston 6, a seal 7, a pressure control piston seal 8, and a shaft 10. The sealed fluid chamber 9 is defined within the caliper body 1 by the caliper body 1, the main piston 2, the cylinder body 4 and the pressure control pistons 5, and a brake fluid is filled in this fluid chamber. The seal piston 6 is provided around the periphery of the main piston 2, and performs to seal the fluid chamber 9, and also performs to return the main piston to an initial position by its elastically-deforming force when the brake is opened. The seal 7 performs to maintain the sealed condition of the fluid chamber 9. The pressure control pistons 5 can slide upward and downward as shown in FIG. 1 within the cylinder body 4 through respective links 11. The links 11 convert a rotary motion into a linear motion as more fully be described later.

When the pressure control pistons 5 are pushed into the fluid chamber 9 in a direction to decrease the volume of the fluid chamber 9 through the respective links 11, the fluid pressure within the fluid chamber 9 increases to move the main piston 2 in a left-hand direction as shown in FIG. 1, thereby effecting a braking operation. When the pressure control pistons 5 retract from the fluid chamber 9 in a direction to increase the volume of the fluid chamber 9, the brake opens.

In FIGS. 1 and 2, the shaft 10 is rotatably supported or journaled in a central portion of the cylinder body 4, and engagement portions 12 are formed respectively in those portions of the shaft 10 respectively facing the pressure control pistons 5, and the links 11 engage respectively in the engagement portions 12. A recess 13 is formed in a central portion of the inner side of each pressure control piston 5, and the link 11 engages in the recess 13. Two stoppers 14, projecting respectively in right and left directions as shown in FIG. 2, are formed on the shaft 10. Four stopper walls 15 are formed on the cylinder body 4, and two of these stopper walls 15 are formed on an upper portion as shown in FIG. 2 of the cylinder body 4 in opposed relation to the associated stopper 14 while the other two stopper walls 15 are formed on a lower portion as shown in FIG. 2 of the cylinder body 4 in opposed relation to the associated stopper 14.

Thus, the engagement portions 12 are formed in the shaft 10, and the links 11 are provided, and the recesses 13 are formed respectively in the pressure control pistons, and with this construction the rotational motion of the shaft 10 can be converted into a linear motion of the pressure control pistons 5.

When the shaft 10 is located in a position shown in FIG. 2, the stoppers 14 abut respectively against the upper right stopper wall 15 and the lower left stopper wall 15, so that the shaft 10 is prevented from further rotation in a counterclockwise direction. When the shaft 10 rotates clockwise from the position shown FIG. 2 into a position shown in FIG. 3, the stoppers 14 abut respectively against the upper left stopper wall 15 and the lower right stopper wall 15, so that the shaft 10 is prevented from further rotation in the clockwise direction. Therefore, when the pressure control pistons 5 are located in their respective positions shown in FIG. 2, these pistons 5 are disposed at their respective upper dead centers, so that the fluid pressure within the fluid chamber 9 is a maximum. On the other hand, when the pressure control pistons 5 are located in their respective positions shown in FIG. 3, these pistons 5 are disposed at their respective lower dead centers, so that the fluid pressure within the fluid chamber 9 is a minimum.

In FIG. 1, a flexible spline 22 of a speed changer 20 (which is known in the art, and will be described later) is fixedly mounted on a right end of the shaft 10 by screws 18 through a fixing member 17. The flexible spline 22 has a tubular shape with one closed end or bottom, as will be more fully described later, and this bottom portion is fixedly secured to the end surface of the shaft by the fixing member 17 and the screws 18.

Figure 4B:
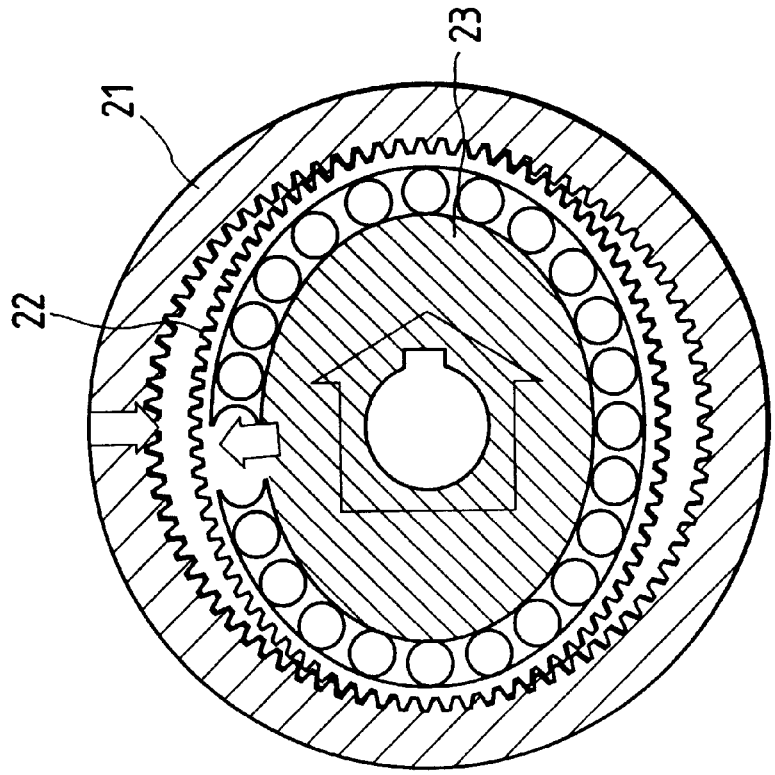
FIG. 4A and FIG. 4B are view explanatory of a speed changer.
Figure 4A:
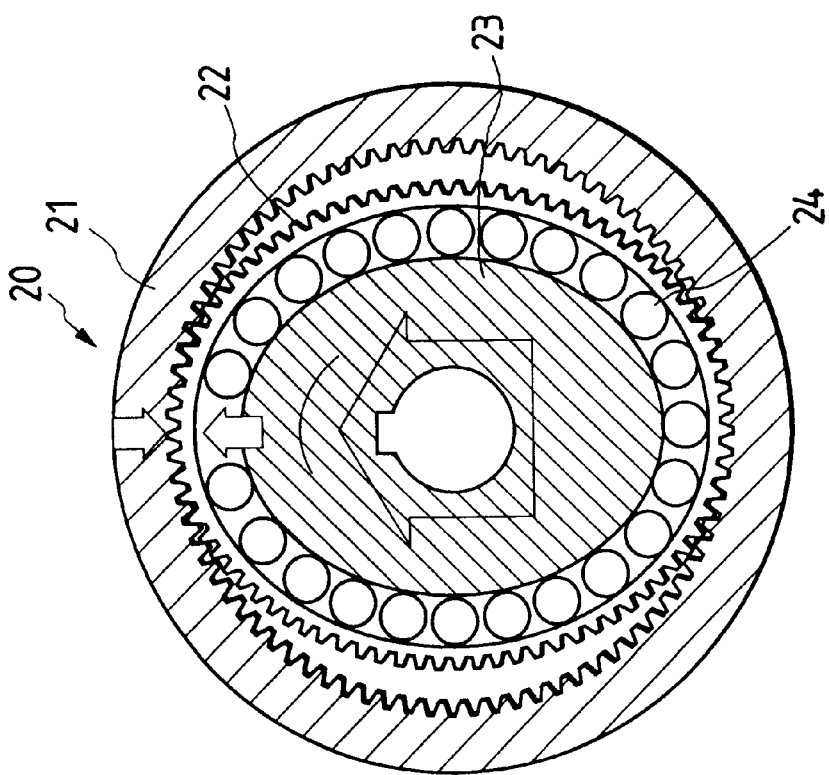

The construction of the speed changer 20 will be described with reference to FIGS. 1 and 4. FIGS. 4A and 4B are front-sectional views of the speed changer 20. Arrows in these Figures indicate an initial meshing position.

In these Figures, the speed changer 20 includes a circular spline 21, the flexible spline 22, and a wave generator 23. The circular spline 21 is provided with a ring-shaped, rigid body, and teeth, each equal in size to teeth formed on an outer periphery of the flexible spline 22 (described later in more detail), are formed on an inner peripheral surface of this ring, and the number of these teeth is larger by two teeth than the number of the teeth formed on the outer periphery of the flexible spline 22.

The flexible spline 22 is disposed inside the circular spline 21, and comprises a cup-shaped, resilient body of metal having a small wall thickness, and the teeth, each equal in size to the teeth on the circular spline 21, are formed on the outer periphery of the flexible spline 22, and the number of these teeth is smaller by two teeth than the number of the teeth on the circular spline 21.

The wave generator 23 includes a cam of an oval shape, and a thin ball bearing 24 fitted on an outer periphery of this cam, and the wave generator 23 has an oval shape as a whole. An inner ring of the ball bearing 24 is fixedly secured to the cam, and an outer ring thereof is resiliently deformable through balls, and an output shaft of a motor (described later) is fixed to this wave generator 23.

Here, assume now that the number of the teeth, formed on the inner periphery of the circular spline 21, is 162 and that the number of the teeth, formed on the outer periphery of the flexible spline 22, is 160. When the oval wave generator 23 rotates clockwise from the condition in FIG. 4A by the motor, the resiliently-deformable flexible spline 22, while deformed in accordance with the rotation of the oval wave generator 23 through the resiliently-deformable outer ring of the ball bearing 24, rotates in such a manner that the teeth thereof sequentially engages the teeth of the circular spline 21 as shown in FIG. 4B. Then, when the wave generator 23 continues to rotate to make one revolution, the flexible spline 22 is shifted in a direction opposite to the direction of rotation of the wave generator 23 (that is, in a counterclockwise direction) by an amount corresponding to two teeth since the number of the teeth of the flexible spline 22 is smaller by two teeth than the number of the teeth of the circular spline 21. Here, when the rotation of the flexible spline 22 is taken out as an output, the number of revolution, reduced in a predetermined ratio relative to the number of revolution of the wave generator, is obtained.

More specifically, here, the number of the teeth of the circular spline 21 is 162 whereas the number of the teeth of the flexible spline 22 is 160, and therefore when the wave generator 23 makes one revolution, the flexible spline 22 makes 1/80 revolution. Thus, the number of revolutions of the motor is reduced by the speed changer 20, and is transmitted to the shaft 10, so that the pressure control pistons 5 are slidingly moved within the cylinder body 4, thereby increasing and decreasing the fluid pressure within the fluid chamber 9.

In FIG. 1, the circular spline 21 is fixedly secured to the caliper body 1 by screws 16, and a central portion of the wave generator 23 is fixedly secured to a motor rotor 26 of the motor 25, and a support shaft 27 is fixedly secured to the central portion of the motor rotor through a holder member 28. That end of the support shaft 27 remote from the motor rotor is supported by a bearing 30 mounted on a motor cover 29, and the holder member 28 has a larger-diameter portion 28a, and an encoder 31 is mounted on an outer peripheral surface of the larger-diameter portion 28a.

The encoder 31 detects the angle of rotation of the shaft 10 from the number of revolutions of the motor 25, and by doing so, the position of each pressure control piston 5 is controlled so as to control the fluid pressure within the fluid chamber 9.

In the present embodiment, although the encoder is a magnetic encoder including a position detection portion, an optical encoder, a resolver or the like may also be used.

A stator portion 32 of the motor 25 is provided around the motor rotor 26, and is fixedly mounted on the caliper body 1. When the motor 25 is energized, the motor rotor 26 is rotated.

The motor 25 operates in response to an instruction from an electronic control unit (ECU). Naturally, the motor 25 is formed into a dust-proof, waterproof construction by the cover 29 and so on. A signal from a sensor 34 for detecting a pressing force applied to a brake pedal, as well as a signal from a sensor 35 such as a speed sensor, is inputted into the electronic control unit (ECU) so that the output of the motor 25 can be controlled in accordance with various braking modes.

The electronic control unit, the various sensors and the motor are similar in basic construction to conventional ones.

The operation of the brake device of the above construction will now be described.

1. In a Brake-Deactivated Condition

In a deactivated condition of the brake, the pressure control pistons 5 are received within the cylinder body 4, so that the sealed fluid chamber 9 is kept in a minimum fluid pressure condition (maximum volume condition), and also the main piston 2 is disposed in its initial condition, and any instruction is not fed from the electronic control unit (ECU), and therefore a fluid pressure does not develop in the fluid chamber 9.

2. In a Brake-operated Condition

When a brake-operated condition is obtained by pressing down the brake pedal 33, this condition is inputted into the electronic control unit (ECU) through the sensor, and the electronic control unit (ECU) drives the motor 25.

When the motor rotor 26 is rotated, the shaft 10 is rotated counterclockwise (in the drawings) through a predetermined angle to move the pressure control pistons 5 outwardly through the links 11, thereby generating a fluid pressure within the fluid chamber 9. The main piston 2, while elastically deforming the seal piston 6, is moved left (in FIG. 1) by this fluid pressure to press the brake pad 3 against a brake disc, thereby producing a braking force.

The amount of outward movement of each pressure control piston 5 is detected from the number of revolutions of the motor 25 which is detected by the encoder 31, and the predetermined braking force is obtained.

When the shaft 10 is rotated a maximum amount, the stoppers 14 of the shaft 10 abut respectively against the corresponding stopper walls 15 as shown in FIG. 2, thereby preventing the pressure control pistons 5 from further outward movement, thus preventing the fluid pressure from further increasing.

When the amount of pressing-down of the brake pedal 33 is reduced, this condition is detected by the sensor, and the electronic control unit (ECU) rotates the motor 25 in a reverse direction to thereby rotate the shaft 10 in a reverse direction, so that the pressing force, applied to each pressure control piston 5 by the associated link 11, is reduced. As a result, each pressure control piston 5 moves inwardly because of the fluid pressure within the fluid chamber 9, and since the fluid pressure within the fluid chamber is decreased, the main piston 2 is returned toward its initial position, utilizing a restoring force of the elastic deformation of the seal piston 6.

Thus, in the above device, the fluid pressure within the fluid chamber 9 in the device can be increased and decreased merely by driving the motor 25, and by controlling the rotational position of the motor rotor 26 while detecting the number of revolutions of the motor 25 by the encoder 31, the braking force of a level, desired by the driver, can be obtained.

Incidentally, since the fluid pressure within the fluid chamber 9 can be increased and decreased through the rotation of the shaft 10, an anti-lock control, an automatic braking operation and a traction control can be effected, utilizing this. The anti-lock control, the automatic braking operation and the traction control are effected in a conventional manner while detecting the condition of wheels and the distance between cars by sensors or the like.

The above-mentioned links can be replaced by cams formed on the shaft, in which case instead of the stoppers, means for limiting the movement of the pressure control pistons 5 is needed.

Next, a second embodiment of the present invention will be described with reference to FIG. 5.

The hydraulic control device according to the second embodiment is provided as an independent device, and therefore this hydraulic control device can be used not only in a brake device, but also as a device for operating various kinds of actuators.

The difference of this embodiment from the first embodiment will be mainly described below.

Figure 5:
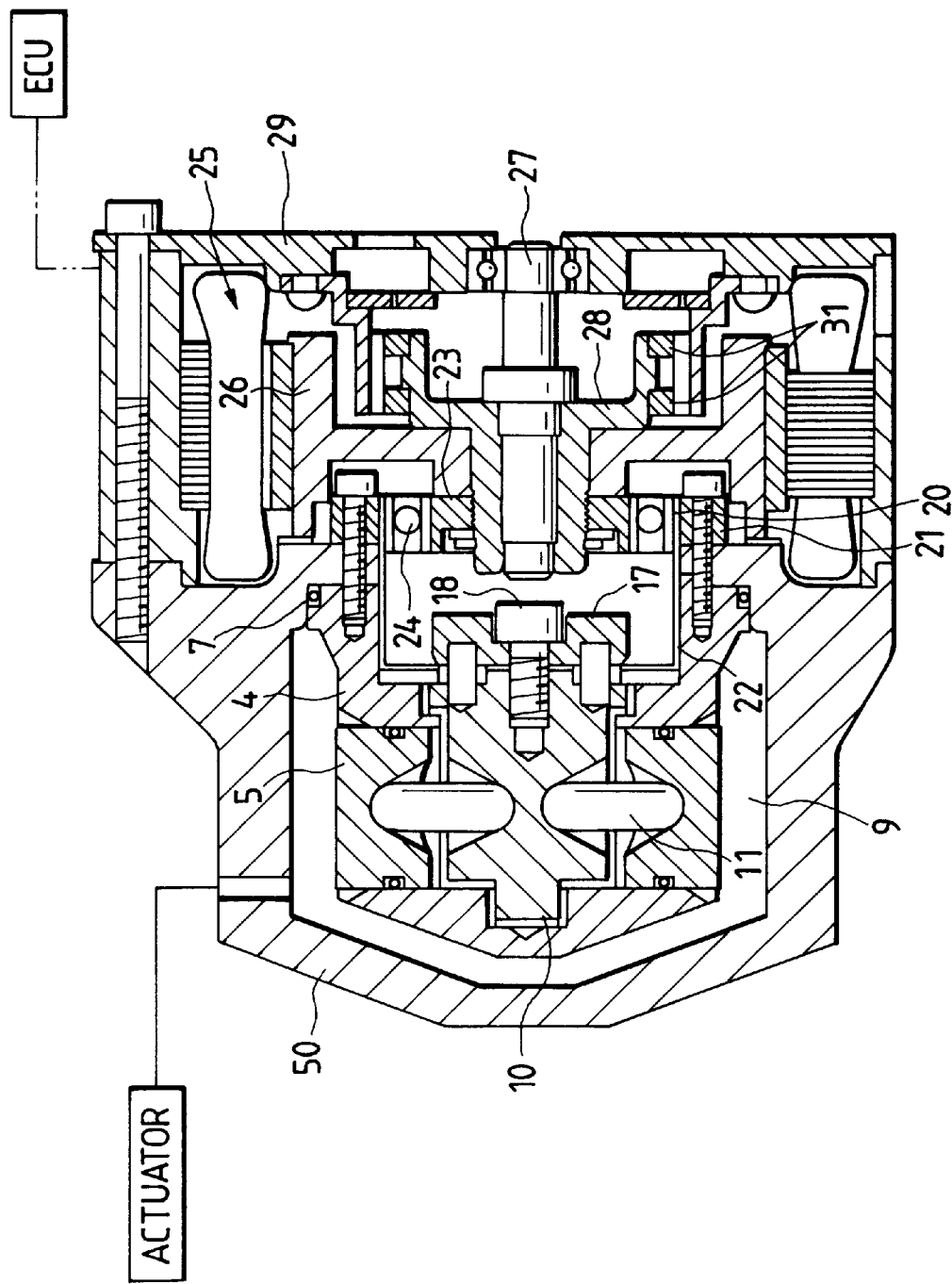
FIG. 5 is a cross-sectional view of a second embodiment of a brake device of the invention.

In FIG. 5, reference numeral 50 denotes a hydraulic control device body replacing the caliper body 1, and pressure control pistons 5 as described above for the first embodiment are provided within the hydraulic control device body 50. The pressure control pistons 5 are moved upward and downward through respective links 11 so as to increase and decrease a fluid pressure within a fluid chamber 9. As shown in the drawings, an actuator is connected to the fluid chamber 9.

In this embodiment, also, a motor 25 is rotated in response to an instruction from an electronic control unit (ECU) as described above for the first embodiment, and therefore a shaft 10 rotates through a speed changer 20 so as to increase and decrease the fluid pressure within the fluid chamber 9, thereby operating the actuator.

Thus, in the second embodiment, the hydraulic control device is provided as an independent device, and therefore this device can be provided in a brake circuit or any other necessary hydraulic circuit, and by doing so, the fluid pressure in the hydraulic circuit can be smoothly increased and decreased.

In this embodiment, also, the link mechanism can be replaced by a cam mechanism.

If the initial position of each pressure control piston 5 is set to a middle position of the range of sliding thereof along the cylinder body 4, the fluid pressure within the fluid chamber 9 can be increased by rotating the shaft 10 in a direction to move each pressure control piston 5 outwardly from this initial position, and also can be decreased by rotating the shaft 10 in a direction to move each pressure control piston 5 inwardly. By thus utilizing the increase and decrease of the pressure within the fluid chamber, the various actuators can be operated.

As described above in detail, in the present invention, the rotational motion, obtained by the motor, is converted into the linear motion between the speed changer and the fluid chamber so as to move the pressure control pistons into the sealed fluid chamber, thereby producing the fluid pressure, and therefore it is not necessary to provide a complicated valve, and the fluid pressure-generating device of an extremely simple construction can be obtained. In the brake device, having this hydraulic control device incorporated in the brake caliper, the anti-lock control, the traction control and the automatic braking operation can be smoothly effected, and also the brake device can be formed into a compact, lightweight design. And besides, merely by moving the pressure control pistons, the required fluid pressure can be easily obtained, and therefore a fluid from the exterior does not flow into and out of the device, and any pulsation will not occur.

When this fluid pressure-generating device is applied to the current brake device, the seal piston in the device can be used without any change, and an additional adjuster device is not needed, and this is advantageous from the viewpoint of the cost. By suitably setting the initial position of the link mechanism or the cam mechanism, the optimum brake control can be effected.

Thus, these various advantageous effects can be achieved.

What is claimed is:

1. A brake device comprising:
   a main piston slidably mounted within a caliper body of said brake device;
   a cylinder body provided inside an inner periphery of said piston;
   a sealed fluid chamber which is formed by said cylinder body and an inner peripheral surface of said main piston, and is filled with a fluid;
   a shaft rotatably mounted on said cylinder body;
   pressure control pistons driven by said shaft to move into and out of said fluid chamber;
   a linear movement conversion mechanism provided between said shaft and each of said pressure control pistons so as to convert a rotation of said shaft into a linear movement of said pressure control pistons;
   a motor for rotating said shaft;
   a speed changer provided between said shaft and said motor so as to transmit the number of revolutions of said motor to said shaft in a manner to reduce said number of revolutions; and
   an electronic control unit (ECU) for controlling said motor.

2. A brake device according to claim 1, wherein said linear movement conversion mechanism comprises links each provided between said shaft and the associated pressure control piston, and said shaft has stoppers for limiting the angle of rotation of said shaft in normal and reverse directions, and maximum and minimum fluid pressures, developing within said fluid chamber, are determined by said stoppers.

3. A brake device according to claim 1 or claim 2, wherein said pressure control pistons, said shaft, said linear movement conversion mechanism and said speed changer are received within said body in a compact manner.

* * * * *